(12) United States Patent
Sunder

(10) Patent No.: US 8,113,494 B2
(45) Date of Patent: Feb. 14, 2012

(54) ACTIVE IMPACT PROTECTION MECHANISM

(75) Inventor: Ashwin Sunder, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 539 days.

(21) Appl. No.: 12/212,872

(22) Filed: Sep. 18, 2008

(65) Prior Publication Data

US 2009/0159408 A1 Jun. 25, 2009

Related U.S. Application Data

(60) Provisional application No. 61/008,711, filed on Dec. 21, 2007.

(51) Int. Cl.
*G01P 15/00* (2006.01)
*F16F 13/00* (2006.01)

(52) U.S. Cl. .............. 267/136; 267/139; 267/140.14; 267/140.5; 73/488

(58) Field of Classification Search ............ 335/219, 335/229; 267/136–141.7; 73/488
See application file for complete search history.

(56) References Cited

U.S. PATENT DOCUMENTS

| | | | |
|---|---|---|---|
| 3,744,588 A * | 7/1973 | Nave, Sr. .................. 180/275 |
| 6,520,013 B1 | 2/2003 | Wehrenberg | |
| 6,768,066 B2 | 7/2004 | Wehrenberg | |
| 7,059,182 B1 * | 6/2006 | Ragner ...................... 73/200 |
| 7,307,228 B2 | 12/2007 | Wehrenberg | |
| 7,351,925 B2 | 4/2008 | Wehrenberg | |
| 2006/0017692 A1 | 1/2006 | Wehrenberg et al. | |
| 2008/0252476 A1 * | 10/2008 | Cosgrove .............. 340/691.7 |

* cited by examiner

*Primary Examiner* — Ramon Barrera
(74) *Attorney, Agent, or Firm* — Kramer Levin Naftalis & Frankel LLP

(57) ABSTRACT

Active cushioning mechanisms that detect imminent impact and activate a damper by driving power from an onboard power supply into an electromagnetic actuator. The electromagnetic actuator transforms the stored electric power into an electromechanical damping force. The actuators may be arranged about the exterior surface of the device, and may be selectively activated to provide protection at different points on the surface depending on the location of expected impact.

40 Claims, 5 Drawing Sheets

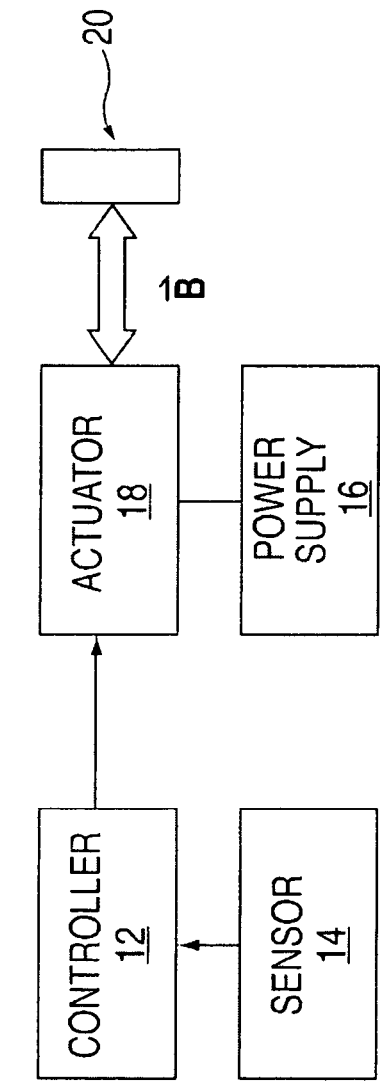
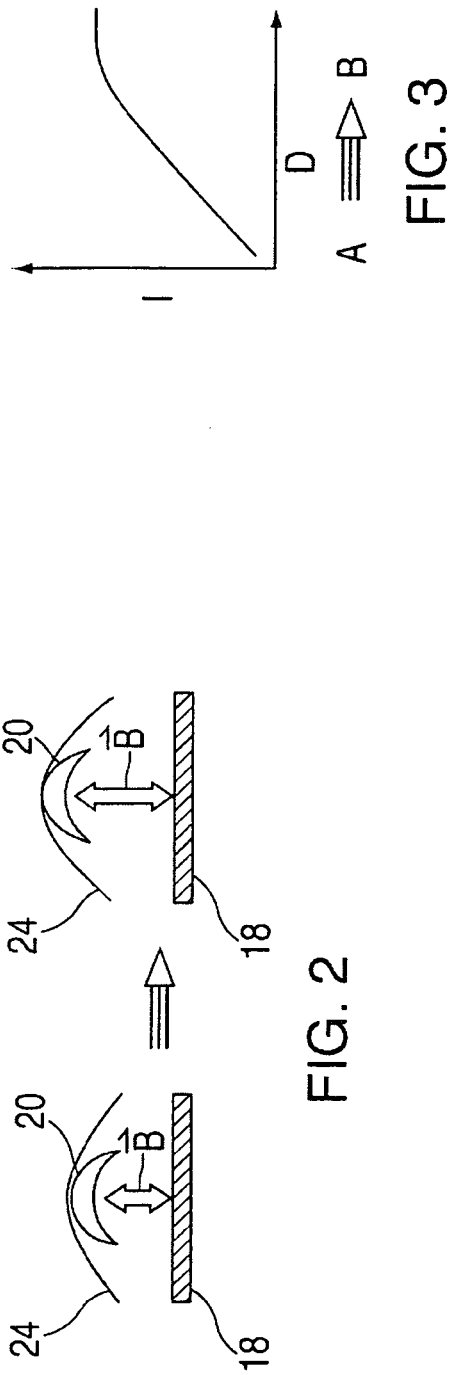

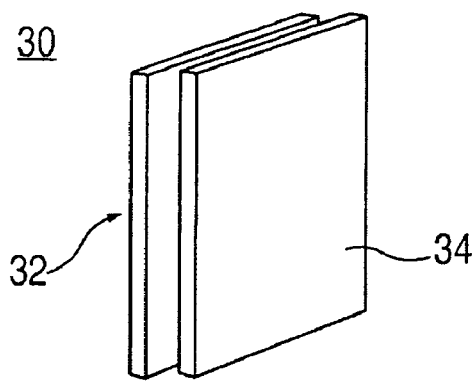
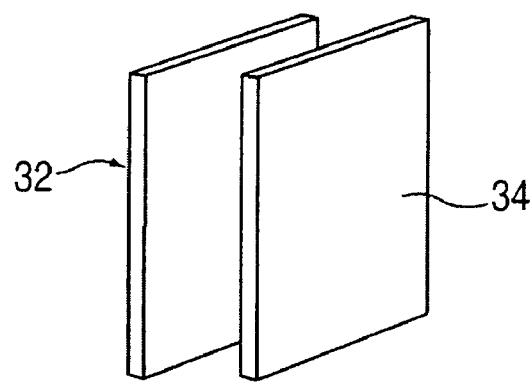
FIG. 4A    FIG. 4B
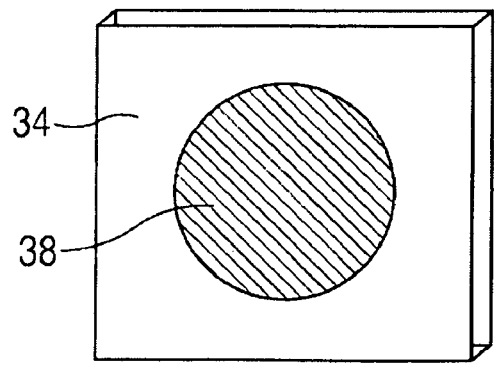
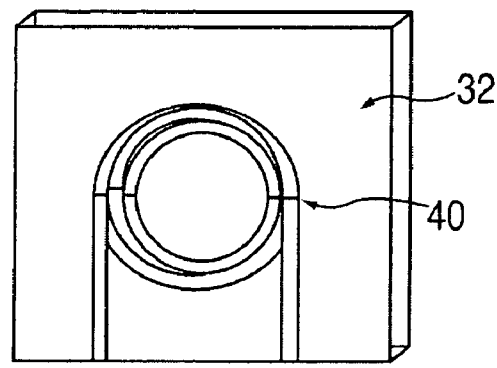
FIG. 5A    FIG. 5B

ACTIVE IMPACT PROTECTION MECHANISM

CROSS-REFERENCE TO RELATED APPLICATION

This claims the benefit of copending, commonly-assigned U.S. Provisional Patent Application No. 61/008,711, filed Dec. 21, 2007, which is hereby incorporated by reference herein in its entirety.

BACKGROUND OF THE INVENTION

This invention relates to methods and systems for protecting a device from the destructive force of an impact.

Portable electronic devices, such as handheld and laptop computers, mobile telephones, and portable media players, are easily carried about, and therefore are at risk of being dropped often from several feet above the ground or another surface. The result of a hard fall can be damaging.

To address these problems, systems have been developed to at least partially protect portable devices from the impact caused by a free fall. Some of these systems may protect only working parts while others are designed to protect the housing of the entire device. However, the latter type of device may increase the size and/or weight of a portable device, while the market trend is for portable devices to become ever smaller.

SUMMARY OF THE INVENTION

The systems and methods described herein provide active cushioning mechanisms that detect imminent impact and activate a damper by driving power from an onboard power supply, which typically is a battery, into an electro-magnetic actuator. The electro-magnetic actuator transforms the stored electric power into a mechanical damping force that can be applied to the area of expected impact.

According to one embodiment of the invention, apparatus for cushioning an object against impact includes a sensor for detecting an unrestrained change in position of the object, and an electromagnetic actuator. The apparatus also includes a controller electrically coupled to the actuator and responsive to the sensor for driving a current through the electromagnetic actuator to create an electromagnetic force to protect the object. The actuator may have two magnets, wherein at least one of the magnets is an electromagnet. The magnets may be opposed to each other with at least one magnet being movable between a first position relative to the other magnet and a second position that is further from the other magnet than the first position. The aforementioned force is exerted between the magnets to dampen an impact on the object.

According to another embodiment of the invention, the housing of a portable electronic device includes an exterior sidewall defining an interior cavity and having an electromagnetic actuator disposed on the exterior sidewall. The housing also encloses a sensor for detecting an unrestrained change in position of the portable electronic device, and a controller electrically coupled to the actuator and responsive to the sensor for driving a current through the electromagnetic actuator to create an electromagnetic force to protect the object. The actuator may include two magnets, wherein at least one of the magnets is an electromagnet. The magnets may be opposed to each other, with at least one magnet being movable between a first position relative to the other magnet and a second position that is further from the other magnet, and from the exterior sidewall, than the first position.

According to another embodiment of the invention, a method for cushioning an object against impact includes mounting an electromagnetic actuator to a surface of the object, wherein the actuator has two opposing members, the first of which is adjacent the surface, and the second of which is movable between a first position relative to the first member and a second position that is further from the first member than the first position. The method also includes detecting an unrestrained change in position of the object, and, responsive to detection of an unrestrained change in position, driving a current through the electromagnetic actuator to move the second member from the first position to the second position to dampen the force of an impact.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 1 depicts schematically the structure of a system according to the invention;

FIG. 2 depicts pictorially the generation of an electromagnetic damping force;

FIG. 3 depicts the relationship between applied current and mechanical separation;

FIGS. 4A and 4B depict an embodiment of an actuator for use with the systems described herein;

FIGS. 5A and 5B present an interior view of the actuator depicted in FIGS. 4A and 4B;

DETAILED DESCRIPTION

Figure 6A:
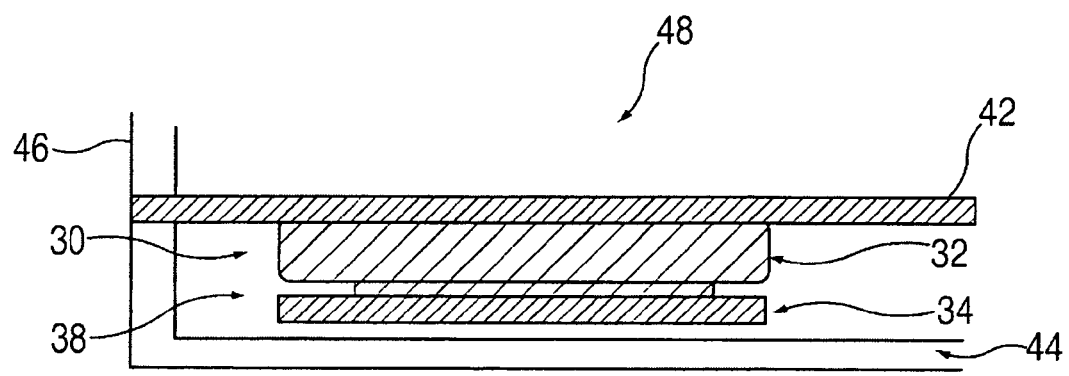
FIGS. 6A and 6B depict an embodiment of a system according to the invention that uses an electromechanical actuator disposed at an exterior sidewall of a device to create an electromechanical damper.

As stated above, systems have been developed to at least partially protect portable devices from the impact caused by a free fall.

For example, laptop computers or other portable devices that incorporate disk drives have been equipped with devices that sense a free fall event and park the disk drive heads as quickly as possible to prevent the heads from colliding with the platters of the hard drive and ruining the drive. Examples of free fall sensors for use in such devices are described in commonly-assigned U.S. Pat. Nos. 6,520,013, 6,786,066, 7,307,228 and 7,351,925, each of which is hereby incorporated by reference herein in its respective entirety. Although these systems can help the drive survive the shock of impact, such systems do not prevent damage to other internal elements of the device, or to external elements such as the display or the housing.

To address these problems, manufacturers may try to provide as rugged an exterior housing as possible given the application, and use resilient shock absorbing materials, such as rubber and silicone, as gaskets and supports for more sensitive components of the device such as glass display screens.

As a more extreme measure, some manufacturers have gone even further and have provided airbag systems that deploy a plastic airbag from underneath a falling portable device, thereby providing a cushion that can absorb the impact of the fall and minimize or prevent damage to the portable device. A system that reacts to the output of an accelerometer in a portable device is described in commonly-assigned United States Patent Publication 2006/0017692, which is hereby incorporated by reference herein in its entirety.

Although airbag devices and rugged housings can prevent damage to the fragile elements of a portable device, these protective mechanisms are bulky and add to the size and weight of portable devices. Consequently, these technologies interfere with designers' ability to create smaller and lighter portable devices.

To provide an overall understanding of the present invention, certain illustrative embodiments will now be described, including an active impact protection device that provides actuators on the exterior surface of a portable device to protect the device against damage from impact. However, it will be understood by one of ordinary skill in the art that the systems and methods described herein can be adapted and modified for other suitable applications and that such other additions and modifications will not depart from the scope hereof. For example, the systems and methods described herein include active impact protection devices that may be incorporated into a sleeve or tube that can fit over a portable device and protect the devices from damage due to impact. These and other embodiments will be made apparent by the following illustrative examples of the systems and methods.

The systems and methods described herein include, among other things, systems for using onboard power to provide impact protection. In particular, the systems and methods described herein use the onboard electrical power supply to power an electromechanical transducer that creates a damping force that can oppose the force from an impact resulting from a collision or free fall. Where the protective device or system is incorporated in a sleeve or tube that fits over the device to be protected, the protective device may include its own power supply, or a connection may be provided to the power supply of the device being protected.

FIG. 1 depicts a functional block diagram that shows a system 10 that provides active impact protection for a hand-held device. The system 10 includes a controller 12, a sensor 14, a power supply 16, an actuator 18 and a movable sidewall 20.

In one embodiment, the system 10 is included in a portable device such as a personal media player of the type that includes a microprocessor, a program memory, a data memory, and a video screen. In such an embodiment, the depicted controller 12 may comprise the onboard microprocessor of the portable media player. However, a separate microprocessor may be provided for portable devices that have no onboard programmable logic, or when other factors demand a separate processor. In either case, the microprocessor will be programmed to operate the actuator 18 so that the actuator 18 creates a mechanical damping force in response to an expected impact.

To that end, the system 10 includes the sensor element 14. The sensor element 14 may also be an onboard element already built into the portable device. For example, certain computers including the portable computer sold by Apple Inc., of Cupertino, Calif., under the trademark POWERBOOK®, may include an onboard acceleration sensor that detects whether the device is going through a free fall, as well as the general orientation of the device.

Accordingly, the sensor 14 may be a free fall sensor of the kind used in portable electronic devices. These free fall sensors have been provided within electronic devices for, among other things, protecting a hard disk drive so that head-disk interference does not occur as the result of an impact from a collision or free fall. These sensors typically include a plurality of accelerometers. Examples of such sensors are the tri-axis multiplexed analog and digital sensors commercially available from the Kionix Corporation, of Ithaca, N.Y. Those sensors are silicon micromachined linear accelerometers and inclinometers in an ASIC package ready for use in a circuit board.

Typically, the three-axis sensor is set up as a low-power linear accelerometer that measures the magnitude of acceleration applied to the portable device. Normally the magnitude of acceleration is approximately 1 G. However, when the device is falling during a free fall event the acceleration magnitude will change to approximately 0 G. The sensor 14 detects this transition phase from 1 G to 0 G and provides a warning signal to the controller 12 as shown in FIG. 1. Other events of unrestrained movement, such as a rapid sliding of the portable device, or a tumbling event, may also be detected and addressed.

Optionally and additionally, the sensor 14 may include a proximity sensor and an orientation sensor, as well as a free fall sensor. The proximity sensor can predict when the portable device may experience the moment of impact. Proximity sensors are commercially available, such as the HSDL-9100 optical proximity sensor manufactured by Agilent Corporation, of Palo Alto, Calif., and any suitable proximity sensor may be employed with the systems and methods described herein. The orientation sensor may predict the orientation the portable device at the moment of impact. One example of a commercially available onboard orientation sensor is the aforementioned orientation sensor provided within the portable computer available from Apple Inc. under the trademark POWERBOOK® However, any suitable sensor or group of sensors may be employed for determining the orientation of the portable device, and its proximity to the impact surface, as it goes through an unrestrained movement toward impact.

The sensor 14 may provide to the controller 12, in addition to the warning signal, an indication as to the orientation of portable device and its proximity to the impact surface. For example, the sensor 14 may indicate to the controller 12 that the device is falling on its face versus its rear side, and indicate when the impact is imminent.

The controller is electrically coupled to the actuator 18 and drives the operation of the actuator 18 to create an electromechanical damping force that may be applied to the movable sidewall 20 to enable the sidewall 20 to absorb the expected impact. To this end, the controller 12 can direct the actuator 18 to draw power from the power supply 16. Typically the power supply 16 will be a lithium-ion battery that is the main onboard power supply for the portable device. However, where the protection system is a separate device that fits over the portable device to be protected, the power supply may be a separate onboard power supply of the protective device.

As impact approaches, the controller 12 can cause the electrical power stored within power supply 16 to be delivered to the actuator 18. To this end, the power supply 16 can have a low impedance coupling to the actuator to allow for rapid delivery of power. The controller 12 can optionally connect to the power supply to switch the low impedance path on and drive current from the electrical supply 16 to the actuator. Alternatively, the power supply can connect to the sensor to allow the sensor to switch the supply to the low impedance coupling. The actuator 18 transforms the electrical power into a magnetic field that mechanically drives the movable sidewall 20 away from the interior elements of the handheld device and toward the expected point of impact.

FIG. 2 depicts the action of the actuator 18 in an embodiment where an exterior surface of the portable device includes a resilient or expandable exterior material that is pushed away from the actuator 18 as the magnetic force drives the movable wall 20 against the resilient exterior material 24. Thus, the actuator 18 transforms the electrical power from the power supply 16 into a force that creates a physical separation between the interior elements of the portable device and its outer most exterior surface 24. As further shown in FIGS. 1 and 2, the actuator 18 creates a magnetic field B that drives the movable wall 20 away from the actuator 18 and against the resilient exterior surface 24. The magnetic field B generates a magnetic damping force that absorbs at least a portion of the impact delivered to the portable device upon contact with the floor or another surface. The magnetic force generated by magnetic field B, as will be described in more detail below, acts as a spring force to protect the portable device from damage.

FIG. 3 depicts an illustrative relationship between the current driven from power supply 16 into the actuator 18 and the distance D that the movable wall 20 is driven away from the interior of the portable device. In particular, FIG. 3 is a graph on which the current, I, is presented on the vertical axis and the distance, D, is presented on the horizontal axis. As depicted in FIG. 3, as the current increases, the distance D also increases, showing that the physical separation that is achieved between the exterior surface 24 of the portable device and the interior elements being protected by the actuator 18 is proportional to the amount of current provided to the actuator 18.

FIGS. 4A and 4B, and 5A and 5B, show, in more detail, one embodiment of an actuator such as actuator 18 depicted in FIG. 1. FIGS. 4A and 4B depict an actuator 30 having two plates 32 and 34. In one embodiment, the two plates 32 and 34 may be square plastic plates, which may be made, e.g., of polystyrene and may measure approximately one-half centimeter on each side. As shown by FIGS. 4A and 4B, the plates 32 and 34 can move relative to each other. In one embodiment, the plate 32 may be a fixed plate that attaches to an interior structure of the portable device, while the plate 34 may be a movable plate that can move away from the interior of the portable device and can push against the optional resilient exterior material 24 shown in FIG. 2. As discussed above, the movable plate 34 can move away from the lower plate 32 by action of an electrically-generated force.

FIGS. 5A and 5B depict an embodiment of the interior structure of the actuator 30, illustrating the electromagnetic elements that generate the aforementioned force. In particular, as shown in FIG. 5A, movable plate 34 can include a permanent magnet 38 located (e.g., centrally) on the plate 34 and connected to the plate 34. The other plate 32 may include a plurality of wire windings 40 that are electrically conductive and that can couple to the power supply 16 of the portable device. As shown in FIG. 4A, the magnet 38 is disposed over the coils 40 when the plates 32 and 34 are aligned. The magnet 38 can optionally fit inside of the interior of the coils 40, or may overlap the coils 40 and sit on top of them. The actual geometry of the magnet 38 and the coils 40 can vary according to the configuration of the portable device, and any suitable geometric configuration including squares, rectangles, and three-dimensional elements may be employed without departing from the scope of the invention. In any case, upon application of a current into the coils 40, the coils 40 behave as an electromagnet or short solenoid carrying a steady current I, thereby generating a magnetic flux that drives the permanent magnet 38 away from the coil 40. This results in the movable plate 34 moving from a first position close to plate 32 and coils 40, to a second position further from plate 32 and coils 40. To keep the plate 32 and 34 aligned, some flexible mechanical structure may be applied that connects the plates 32 and 34 but allows them to move relative to each other. These connecting elements are not shown in order to allow clear illustration of the components of the actuator 30 depicted in FIGS. 4A and 4B and 5A and 5B.

Figure 6B:
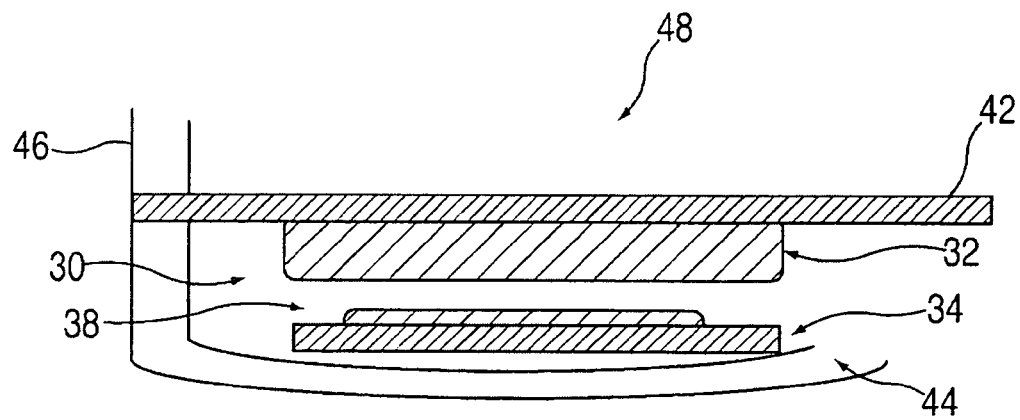

FIGS. 6A and 6B illustrate in more detail the actuator 30 as it may be used to protect a portable device. In particular, FIG. 6A depicts the actuator 30 positioned against an exterior wall 42 of a portable device. Above the exterior wall 42 is an interior cavity 48 into which the components of the portable device such as the microprocessor, the glass display and other elements can be contained. The exterior wall 42 forms part of the outer casing of the portable device. A flexible membrane 44 extends over the exterior wall 42. The actuator 30 sits between the flexible membrane 44 and exterior wall 42.

When sensor 14 detects a free fall, the sensor delivers a warning signal to the controller 12. The controller 12 can activate the actuator 30. The actuator 30 will draw power from the onboard power supply 16 filling the coils 40 with current and generating a magnetic field that drives the plate 34 away from the exterior wall 42. The movable plate 34 pushes against the flexible membrane 44 and deforms that membrane as shown in FIG. 6B. A physical separation is formed between the plate 32 and the plate 34 and a magnetic force exerted in that space acts as a damping force that can absorb at least some of the impact caused by the free fall.

Figure 7:
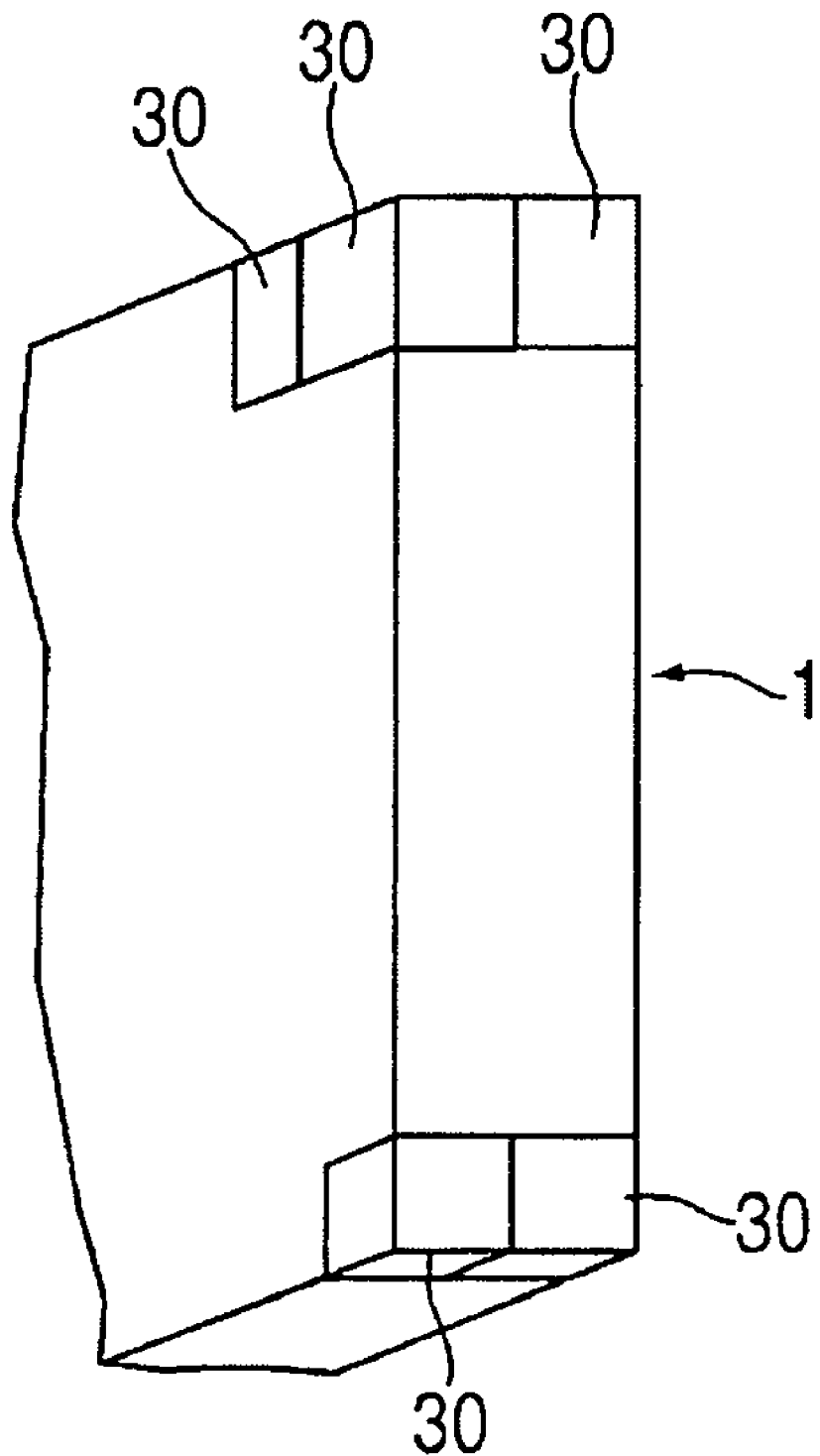
FIG. 7 depicts one embodiment of a housing for a handheld device having impact protection mechanisms according to the invention located at corners of the housing.

The exterior casing of the handheld device may include a plurality of actuators 30 to provide cushioning across a large area of the device. Alternatively, as shown in FIG. 7, actuators 30 may be placed at select locations of the portable device, such as the corners of portable device 1. Optionally, the controller 12, upon receiving a warning signal from the sensor 14, can activate all of the actuators 30 positioned on the surface of the portable device. Optionally and alternatively, an orientation sensor located within sensor 14 may provide the controller with an indication as to which portion of the portable device is likely to strike upon impact. In such an embodiment, the controller 12 can selectively activate only certain selected ones of the actuators fixed to the exterior surface of the portable device.

Figure 8:
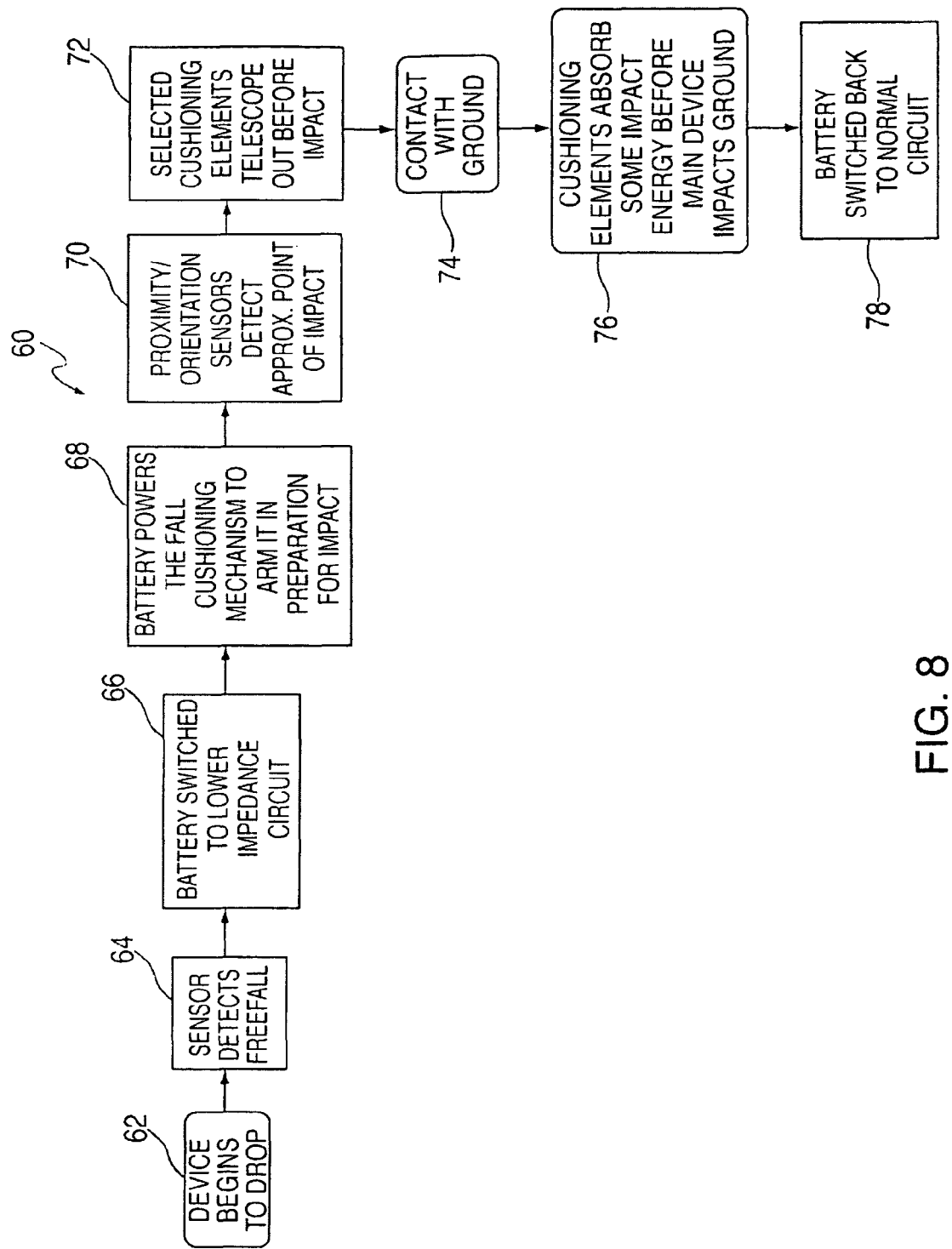
FIG. 8 is a flow diagram illustrating an embodiment of a method according to the invention.

FIG. 8 depicts an exemplary flow diagram of a process according to the invention. In particular, FIG. 8 depicts a process 60 that begins in step 62 wherein the device begins to go through an unrestrained movement, which in this example is a free fall drop to the floor, ground or other surface.

In step 64 the sensor detects the free fall and estimates a time to impact (e.g., 0.5 seconds). Preferably, the sensor filters out any acceleration profile that is not representative of a sustained free fall. For example, an unrestrained movement can be ignored for a few milliseconds, because any movement that does not last longer than that is unlikely to cause damage to the portable device. If the movement is not filtered out, the sensor may deliver a warning signal that will begin preparation of the device for impact. Alternatively, preparation for impact may be begin only after both the warning signal and a signal from a proximity detector that the device is approaching a surface.

As part of the preparation for impact, in step 66, the onboard power supply electronically switches to a lower impedance circuit. This switching is done to avoid overheating from the rapid discharge experienced as the battery powers the actuator. In step 68, the battery powers the cushioning mechanism to arm it in preparation for impact. The discharge from the battery can occur at a rate that would lead to 100% discharge in 3-6 minutes. As an example of the discharge, for a battery that normally lasts for one hour, the discharge rate may be 20 C. At such a rate, the battery will be able to deliver 20 times its nominal rated current (or power) for one-twentieth its normal discharge time. Therefore, a 55 W-hr battery discharging at 20 C could deliver 1100 W for up to three minutes. The total energy delivered to the impact protection system during the 0.5-second interval that occurs in the fall before impact would be 550 W-sec.

An optional step 70 relies on the aforementioned proximity sensor and orientation sensor to detect the approximate point on the exterior of the device that will impact the surface. This allows the controller to selectively focus power to those actuators that will need to cushion the device. In step 72 the selected cushioning elements telescope out before impact as predicted. In step 74 contact with the surface occurs, and in step 76 the cushioning elements absorb some impact energy before the device itself impacts the surface. In step 78 the battery is switched back to a normal circuit as before, and the process 60 ends.

Although the systems and methods described above have discussed active impact protection for a portable device that cushion the entire device from impact, such active impact protection devices may be used to support and protect specific elements within a device. For example, a portable device having a breakable display may use active impact protection as described herein to protect the display. During a free fall, the actuators may deploy so that the display is held in place by the deployed actuators, providing shock absorption for the display. Further, in a device that has the display relatively flush with the exterior surface of the device, the actuators may be used to move the display inwardly into the interior of the device, helping to prevent the display from making first contact with the surface and absorbing the majority of the impact.

Similarly, while the active protection mechanisms described herein have been illustrated by embodiments that are integrated into the portable device to be protected, an active impact protection device may be realized as a separate sleeve or covering that is independently powered and can fit over a portable device to protect that device.

Accordingly, it will be understood that the invention is not to be limited by the embodiments disclosed herein, which are presented for purposes of illustration and not of limitation, and the present invention is limited only by the claims which follow.

What is claimed is:

1. Apparatus for cushioning an object against impact, comprising:
a sensor for detecting an unrestrained change in position of the object;
an electromechanical actuator having a first member affixed to a portion of the object, and a second member movable between a first position adjacent the first member and a second position further from the first member than the first position, wherein the first and second members are magnets, and wherein at least one of the magnets comprises an electromagnet; and
a controller that is electrically coupled to the actuator and that is responsive to the sensor for activating the actuator by driving current through the at least one of the magnets that is an electromagnet to move the second member from the first position to the second position.

2. The apparatus of claim 1 wherein:
the apparatus further comprises a power supply; and
the controller is responsive to the sensor to activate the actuator by driving the current from the power supply through the at least one of the magnets that is an electromagnet.

3. The apparatus of claim 2 wherein the power supply is internal to the object.

4. The apparatus of claim 1 wherein the sensor comprises an accelerometer.

5. The apparatus of claim 4 wherein the controller recognizes an unrestrained change in position from an acceleration profile output by the accelerometer.

6. The apparatus of claim 1 wherein the portion is a surface of the object.

7. The apparatus of claim 6 wherein the sensor comprises an orientation sensor to determine orientation of the object during the unrestrained change in position.

8. The apparatus of claim 7 comprising:
a plurality of actuators on the surface of the object; and
the controller is responsive to the orientation sensor to activate an appropriate one or more of the actuators.

9. The apparatus of claim 1 wherein the sensor comprises a proximity sensor to signal an imminent impact.

10. The apparatus of claim 1 further comprising a power control circuit having a low impedance coupling to the actuator.

11. The apparatus of claim 1 wherein:
the portion is a component of the object; and
the actuator acts as a mount for the component to protect the component against impact.

12. The apparatus of claim 11 wherein the component is a display screen.

13. The apparatus of claim 1, wherein the driving current through the electromagnet generates a magnetic flux that drives the second member from the first position to the second position.

14. A housing for a portable electronic device, comprising:
an exterior sidewall defining an interior cavity;
a sensor for detecting an unrestrained change in position of the device;
an electromechanical actuator having a first member affixed to a portion of the sidewall, and a second member movable between a first position adjacent the first member and a second position further from the first member than the first position; and
a controller coupled to the actuator and responsive to the sensor for activating the actuator, wherein, when activated, the actuator creates an electromagnetic force to move the second member from the first position to the second position.

15. The housing of claim 14 wherein:
the first and second members are magnets, at least one of the magnets being an electromagnet; and
the controller is electrically coupled to the actuator and is responsive to the sensor to activate the actuator by driving current through the at least one of the magnets that is an electromagnet.

16. The housing of claim 14 wherein the exterior sidewall comprises a sleeve of material having the actuator disposed therein and being dimensioned to fit over the portable electronic device.

17. The housing of claim 16 further comprising a supply of electrical power disposed in the sleeve.

18. The housing of claim 16 further comprising a connection to a supply of electrical power in the portable electronic device.

19. The housing of claim 14 wherein the sensor comprises an accelerometer.

20. The housing of claim 19 wherein the controller recognizes an unrestrained change in position from an acceleration profile output by the accelerometer.

21. The housing of claim 14 wherein the sensor comprises an orientation sensor to determine orientation of the device during the unrestrained change in position.

22. The housing of claim 21 comprising:
a plurality of actuators on the sidewall; and
the controller is responsive to the orientation sensor to activate an appropriate one or more of the actuators.

23. The housing of claim 14 wherein the sensor comprises a proximity sensor to signal an imminent impact.

24. The housing of claim 14 further comprising a power control circuit having a low impedance coupling to the actuator.

25. The housing of claim 14 wherein:
the portion is a component of the device; and
the actuator acts as a mount of the component for protecting the component against impact.

26. The housing of claim 25 wherein the component is a display screen.

27. The housing of claim 14 further comprising a resilient layer disposed over the exterior sidewall and covering the actuator.

28. The housing of claim 14 wherein the exterior sidewall comprises a sleeve of material having the actuator disposed therein and being dimensioned to fit over the portable electronic device.

29. The housing of claim 28 further comprising a supply of electrical power disposed in the sleeve.

30. The housing of claim 28 further comprising a connection to a supply of electrical power in the portable electronic device.

31. The housing of claim 14, wherein the electromagnetic force is exerted between the first member and the second member to dampen an impact on the sidewall.

32. A method for cushioning an object against impact, the method comprising:
mounting an electromechanical actuator to a surface of the object, the actuator having a first member adjacent a portion of the surface, and a second member movable between a first position adjacent the first member and a second position further from the first member than the first position;
detecting an unrestrained change in position of the object; and
responsive to detection of the unrestrained change in position, activating the actuator to apply an electromagnetic force to move the second member from the first position to the second position, whereby the electromagnetic force damps force of an impact.

33. The method of claim 32, wherein activating the actuator comprises driving a current from a power supply to the actuator.

34. The method of claim 33 further comprising, responsive to detection of the unrestrained change, switching the power supply to a lower impedance circuit before driving the current from the power supply to the actuator.

35. A method for cushioning an object against impact, the method comprising:
detecting an unrestrained change in position of the object;
responsive to detection of the unrestrained change in position, detecting at least one of an orientation of the object and a proximity of the object to an impact surface; and
responsive to detection of the at least one of the orientation of the object and the proximity of the object to an impact surface, selectively activating only certain actuators of a plurality of actuators, wherein:
each actuator of the plurality of actuators comprises a first member affixed to a portion of the object, and a second member movable between a first position adjacent the first member and a second position further from the first member than the first position; and
the activating of each actuator of the certain actuators comprises moving the second member from the first position to the second position.

36. The method of claim 35 wherein the activating of each actuator of the certain actuators further comprises generating an electromagnetic force that is exerted between the first member and the second member.

37. The method of claim 35 wherein:
the first and second members of each actuator of the plurality of actuators are magnets;
at least one of the magnets of each actuator of the plurality of actuators is an electromagnet; and
the activating of each actuator of the certain actuators further comprises driving current through the at least one of the magnets that is an electromagnet.

38. Apparatus for cushioning an object against impact, comprising:
a first sensor for detecting an unrestrained change in position of the object;
a second sensor for detecting at least one of an orientation of the object and a proximity of the object to an impact surface;
a plurality of electromechanical actuators, wherein each actuator comprises a first member affixed to a portion of the object, and a second member movable between a first position adjacent the first member and a second position further from the first member than the first position; and
a controller coupled to the first sensor, the second sensor, and each actuator of the plurality of actuators, wherein:
the controller activates only certain actuators of the plurality of actuators in response to information detected by the first sensor and in response to information detected by the second sensor; and
activation of each actuator of the certain actuators moves the second member of each actuator of the certain actuators from the first position to the second position.

39. The apparatus of claim 38 wherein:
the first and second members of each actuator of the plurality of actuators are magnets;
the activation of each actuator of the certain actuators drives current through at least one of the first and second members of each actuator of the certain actuators.

40. The apparatus of claim 38 wherein:
the portion of the object is an exterior sidewall of the object;
the apparatus further comprises a resilient layer disposed over the exterior sidewall such that the plurality of actuators are disposed between the exterior sidewall and the resilient layer; and
the movement of the second member of each actuator of the certain actuators moves the resilient layer away from the exterior sidewall.

* * * * *